(12) United States Patent
Bossard

(10) Patent No.: US 8,105,402 B1
(45) Date of Patent: Jan. 31, 2012

(54) MICRO-CHANNEL STEAM REFORMER AND SYSTEM FOR EXTRACTING ULTRA-PURE HYDROGEN GAS FROM A HYDROCARBON FUEL

(76) Inventor: Peter R. Bossard, Ivyland, PA (US)

( * ) Notice: Subject to any disclaimer, the term of this patent is extended or adjusted under 35 U.S.C. 154(b) by 774 days.

(21) Appl. No.: 12/182,541

(22) Filed: Jul. 30, 2008

(51) Int. Cl.
*C01B 3/12* (2006.01)
*C01B 3/36* (2006.01)
*C10J 3/46* (2006.01)

(52) U.S. Cl. ............... 48/197 R; 48/198.1; 423/650; 423/651; 423/652; 423/655

(58) Field of Classification Search ........ 48/197 R, 48/198.1; 423/650, 651, 652, 655
See application file for complete search history.

(56) References Cited

U.S. PATENT DOCUMENTS

| | | | | |
|---|---|---|---|---|
| 2,625,470 A | * | 1/1953 | Roberts, Jr. | 48/198.1 |
| 4,690,690 A | * | 9/1987 | Andrew et al. | 48/214 A |
| 5,004,592 A | * | 4/1991 | Pinto | 423/652 |
| 5,876,469 A | * | 3/1999 | Moriya et al. | 48/197 R |
| 7,462,209 B2 | * | 12/2008 | Berggren et al. | 48/197 R |
| 7,541,007 B2 | * | 6/2009 | Pattekar et al. | 422/187 |
| 2006/0046113 A1 | * | 3/2006 | Wang et al. | 429/20 |
| 2007/0087935 A1 | * | 4/2007 | Kim et al. | 502/439 |
| 2008/0148636 A1 | * | 6/2008 | Hartvigsen et al. | 48/127.7 |

* cited by examiner

*Primary Examiner* — Timothy Vanoy
(74) *Attorney, Agent, or Firm* — LaMorte & Associates

(57) ABSTRACT

A steam reformer is use in a fuel processor system to create a water gas shift reaction between a hydrocarbon fuel and water. A hydrocarbon fuel and water are provided. The water is heated to superheated steam. The hydrocarbon fuel is mixed with the superheated steam to produce a vaporized fuel/steam mixture. The vaporized fuel/steam mixture is directed into a gap space between separate surfaces. The gap space between the separate surfaces is very small. Within this confined gap space, at least one of the separate surfaces is heated to maintain a reaction temperature range that induces the water gas shift reaction. The water gas shift reaction produces reactant gases that include hydrogen gas and contaminant gases. At least some of the contaminant gases are burned to heat the gap space.

17 Claims, 3 Drawing Sheets

MICRO-CHANNEL STEAM REFORMER AND SYSTEM FOR EXTRACTING ULTRA-PURE HYDROGEN GAS FROM A HYDROCARBON FUEL

BACKGROUND OF THE INVENTION

1. Field of the Invention

In general, the present invention relates to systems and methods that are used to steam reform liquid fuel to generate a volume of mixed gases. More particularly, the present invention is related to systems and methods that extract hydrogen from a combined mixture of fuel and water that undergoes a water gas shift reaction.

2. Prior Art Description

In industry, there are many applications for the use of ultra pure molecular hydrogen. For instance, there are many fuel cells that operate using hydrogen. The hydrogen, however, must be ultra pure. In the art, ultra pure hydrogen is commonly considered to be hydrogen having purity levels of at least 99.999%. Any molecules of carbon dioxide, carbon monoxide or other contaminant gases that are received by the fuel cell either reduces its efficiency or causes damage to the fuel cell.

Hydrogen gas does not exist naturally on earth to any significant extent because it reacts with many elements and readily combines to form compounds. Hydrogen gas must therefore be manufactured. Hydrogen gas can be manufactured in a number of ways. For instance, hydrogen gas can be created by splitting water molecules through electrolysis. However, the power needed for electrolysis is always greater than the power available from a fuel cell that utilizes the output hydrogen gas from the electrolysis. Any fuel cell system that obtains hydrogen gas from electrolysis, therefore, results in a net power loss.

Techniques have been developed where hydrogen gas can be extracted from the reformate gases of a hydrocarbon fuel and water mixture that have undergone an endothermic reaction. This initial endothermic reaction occurs between 250° C. and 1000° C., wherein the hydrocarbon fuel and water are primarily converted into hydrogen ($H_2$), carbon monoxide (CO), methane ($CH_4$), carbon dioxide ($CO_2$) and water ($H_2O$). The amount of energy required for the reaction depends upon the hydrocarbon being used. A principle challenge is to efficiently supply the energy needed to exhaust the chemical reactions.

The useful chemical energy in the resultant gases is contained in the $H_2$, CO and $CH_4$. The chemical energy in these three resultant gases contains the chemical energy that was originally in the hydrocarbon fuel, plus some of the endothermic energy that was used to heat the reaction.

The resultant gases of $H_2$, $CH_4$, CO and $CO_2$ are used in a water gas shift reaction. The resultant gases are mixed with steam at an elevated temperature of between 300° C. and 450° C. In this temperature range, a water gas shift reaction is induced. Once the water gas shift reaction is induced, the CO and the $CH_4$ present in the resultant gases react with the water ($H_2O$). The CO and the $H_2O$ react as follows:

$$CO + H_2O \rightarrow CO_2 + H_2$$

It can therefore be seen that a large amount of hydrogen gas can be created by the water gas shift reaction. The hydrogen gas is then purified by drawing the hydrogen gas through a hydrogen permeable membrane in a hydrogen separator. The efficiency of this process can be improved when the steam is first removed from the reformate gas stream prior to the separation of the hydrogen. This increases the partial pressure of the hydrogen in the reformate stream, thus making the hydrogen permeation through the membrane much more efficient. The purified hydrogen can then be used to power a fuel cell or serve some other industrial purpose. Systems that utilize a water gas shift reaction in such a manner are exemplified by U.S. patent application Ser. No. 11/341,541, now U.S. Pat. No. 7,704,485 entitled System And Method For Processing Fuel For Use By A Fuel Cell Using A Micro-Channel Catalytic Hydrogen Separator, and U.S. patent application Ser. No. 11/522,139, now abandoned, entitled System And Method For Efficiently Extracting Ultra-Pure Hydrogen Gas From A Hydrocarbon Fuel.

The equations of the water gas shift reaction provided above, of course, react until a chemical balance is achieved. In reality, very few chemical reactions continue until exhaustion. Accordingly, in reality, when a water gas shift reaction occurs, some methane, carbon monoxide, and water remains in the raffinate gas. The amount of carbon monoxide that remains depends largely upon the steam to carbon ratio present in the reaction. The present invention describes a steam reformer assembly and a fuel processor system that utilizes the steam reformer assembly to increase the efficiencies of the reforming reaction by readily and uniformly transferring the energy in the combustion chamber to the fuel and steam mixture. The present invention steam reformer and fuel processor system are described and claimed below.

SUMMARY OF THE INVENTION

The present invention is a steam reformer that efficiently enables the endothermic energy required for the reforming reaction to be uniformly supplied to the fuel and steam stream. It can be used in a fuel processor system to create a water gas shift reaction between a hydrocarbon fuel and water. A hydrocarbon fuel and water are provided. The water is heated to superheated steam. The hydrocarbon fuel is mixed with the superheated steam to produce a vaporized fuel/steam mixture. The vaporized fuel/steam mixture is directed into a gap space between separate surfaces. The gap space between the separate surfaces is very small and is preferably no greater than 5000 microns.

Within this confined gap space, at least one of the separate surfaces is heated to maintain a reforming reaction of fuel vapor and steam that shifts the reaction to or past the equilibrium attained in water gas shift reactions.

The water gas shift reaction between the hydrocarbon fuel and the steam produces reactant gases that include hydrogen gas and contaminant gases. At least some of the contaminant gases are burned to heat the gap space. At least some of the hydrogen gas is separated from the contaminant gases and is used for a secondary purpose, such as powering a fuel cell.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention steam reformer and fuel processor system can be used to generate ultrapure hydrogen for a variety of industrial applications, the steam reformer and fuel processor system are particularly well suited for use in generating hydrogen gas for a proton exchange membrane (PEM) fuel cell. Accordingly, the exemplary embodiment of the fuel processor system includes a PEM fuel cell to set forth the best mode contemplated for the design. However, it should be understood that both the steam reformer and the overall fuel processor system can be used to generate ultra-pure hydrogen for other purposes.

Figure 1:
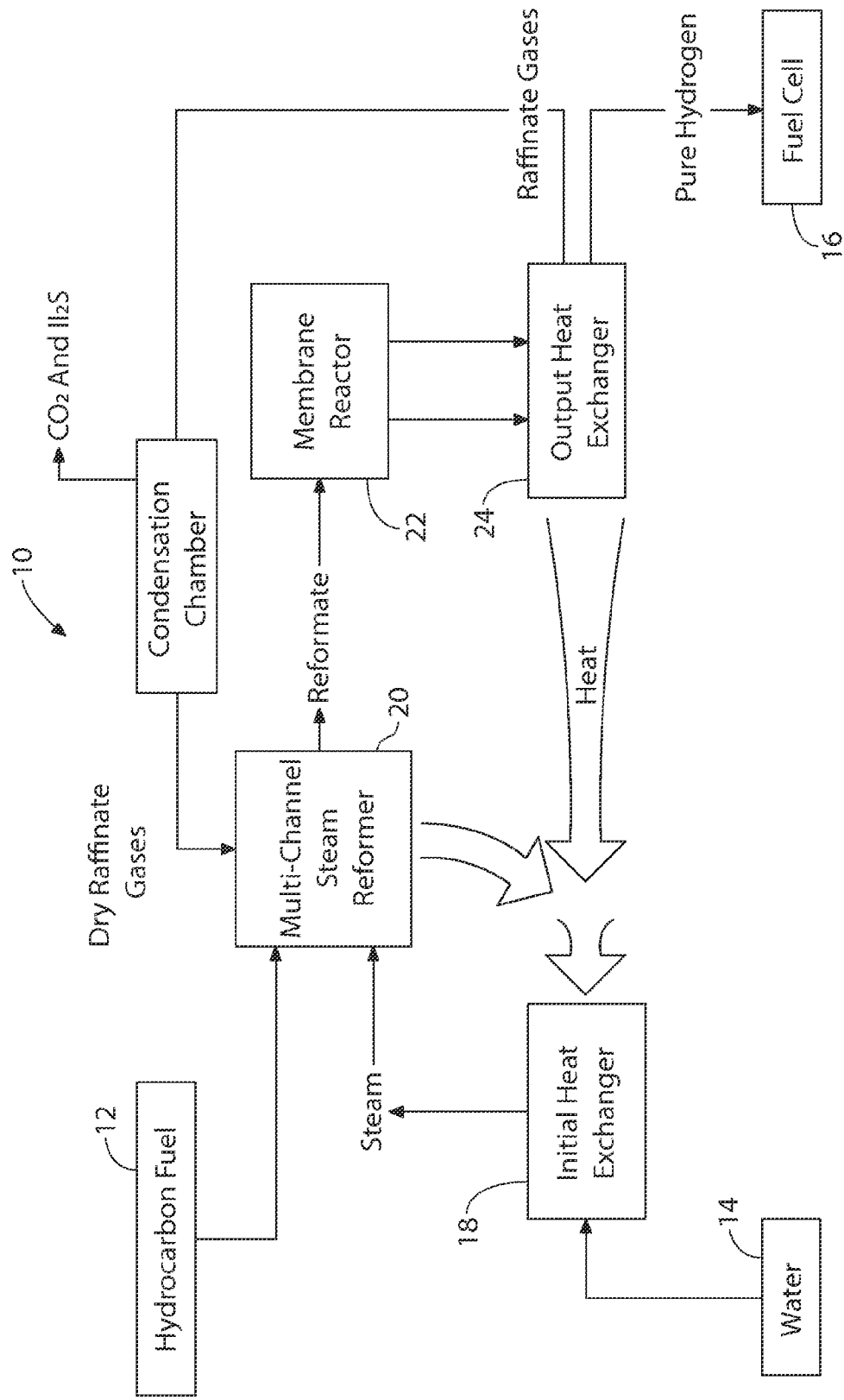
FIG. 1 is a schematic of an exemplary embodiment of a fuel processor system shown in conjunction with a fuel cell.

Referring to FIG. 1, there is shown a schematic of a fuel processor system 10. The fuel processor system 10 reacts a hydrocarbon fuel 12 and water 14 to produce hydrogen gas in a highly efficient manner. The hydrogen gas produced is ultra-pure and is used for a secondary purpose, such as powering a PEM fuel cell 16.

The fuel processor system 10 includes an initial heat exchanger 18. Water 14 is converted to superheated steam by the initial heat exchanger 18. The hydrocarbon fuel 12 is mixed with the superheated steam. Upon mixing, the hydrocarbon fuel 12 is completely vaporized and begins to react with the steam. The fuel/steam combination is fed into a micro-channel steam reformer 20. Within the micro-channel steam reformer 20, the conditions for the water gas shift reaction are maximized, as will later be explained in detail. The micro-channel steam reformer 20 produces reformate gases that include primarily hydrogen ($H_2$), carbon dioxide ($CO_2$) and steam ($H_2O$). However, smaller concentrations of carbon monoxide (CO) and methane ($CH_4$) are also present. Furthermore, depending upon the type of hydrocarbon fuel 12 being used, trace amounts of hydrogen sulfate ($H_2S$) may also be present.

As will later be explained, the micro-channel steam reformer 20 is actively heated by combustion in order to provide the energy needed to maintain the endothermic reaction. Heat from the combustion exhaust gases are transferred to the initial heat exchanger 18 to help heat the incoming water.

The reformate gases from the micro-channel steam reformer 20 are fed to a membrane reactor 22. The membrane reactor 22 is a hydrogen separator that contains a hydrogen permeable membrane and enables hydrogen gas to be separated from the remaining reformate gases. Although many different membrane reactor designs can be utilized, the preferred membrane reactor is a micro-channel membrane reactor, such as that described in co-pending U.S. patent application Ser. No. 12/053,528, entitled Hydrogen Gas Separator System Having Micro-Channel Construction For Efficiently Separating Hydrogen Gas From A Mixed Gas Source, the disclosure of which is incorporated into this specification by reference.

The membrane reactor 22 is not one-hundred percent efficient. Consequently, some hydrogen gas passes into the raffinate stream output. The raffinate stream exiting the membrane reactor 22, therefore, contains some hydrogen ($H_2$) as well as the carbon dioxide ($CO_2$), steam ($H_2O$), carbon monoxide (CO), methane ($CH_4$) and hydrogen sulfate ($H_2S$) that entered the membrane reactor 22.

The pure hydrogen and the raffinate gases that exit the membrane reactor 22 are at the operational temperature of the membrane reactor 22, which is between 550 degrees Celsius and 800 degrees Celsius. Both the pure hydrogen and the raffinate pass through an output heat exchanger 24. The output heat exchanger 24 transfers heat to the initial heat exchanger 18 through coolant circulation, convection, and/or direct conduction. It will be understood that the initial heat exchanger 18 and the output heat exchanger 24 can be separate components that are thermally interconnected or a single heat exchanger assembly. Regardless, heat from the pure hydrogen and raffinate gases are used to provide the initial heat exchanger 18 with enough energy to convert incoming water 14 into superheated steam.

The raffinate gases exiting the membrane reactor 22 has much of its thermal energy reclaimed by the output heat exchanger 24. The raffinate gases, however, also still contain some chemical energy. Consequently, the raffinate gases are not directly vented as exhaust. Rather, the flow rate through the membrane reactor 22 is controlled so that the raffinate gases contain just enough hydrogen gas and methane to burn. To enhance the combustion characteristics of the raffinate gases, much of the steam contained in the raffinate gases is removed. The steam is removed by cooling the raffinate gases below the condensation temperature of steam. This can be achieved by removing heat from the raffinate gases via the output heat exchanger 24. Once the raffinate gases have cooled to below one hundred degrees Celsius, the steam condenses to water. As the water condenses, much of the carbon dioxide ($CO_2$) and hydrogen sulfide ($H_2S$) dissolves into the condensed water. The result is that the remaining gaseous raffinate stream is both dried and simplified. The dry raffinate gases, therefore, contain primarily hydrogen ($H_2$), carbon monoxide (CO), and methane ($CH_4$). The hydrogen ($H_2$) and methane ($CH_4$) contained in the dried raffinate gases are combustible and are used to heat the micro-channel steam reformer 20. Consequently, both the thermal energy and the remaining chemical energy of the raffinate is recaptured, therein producing a highly energy efficient system.

Figure 2:
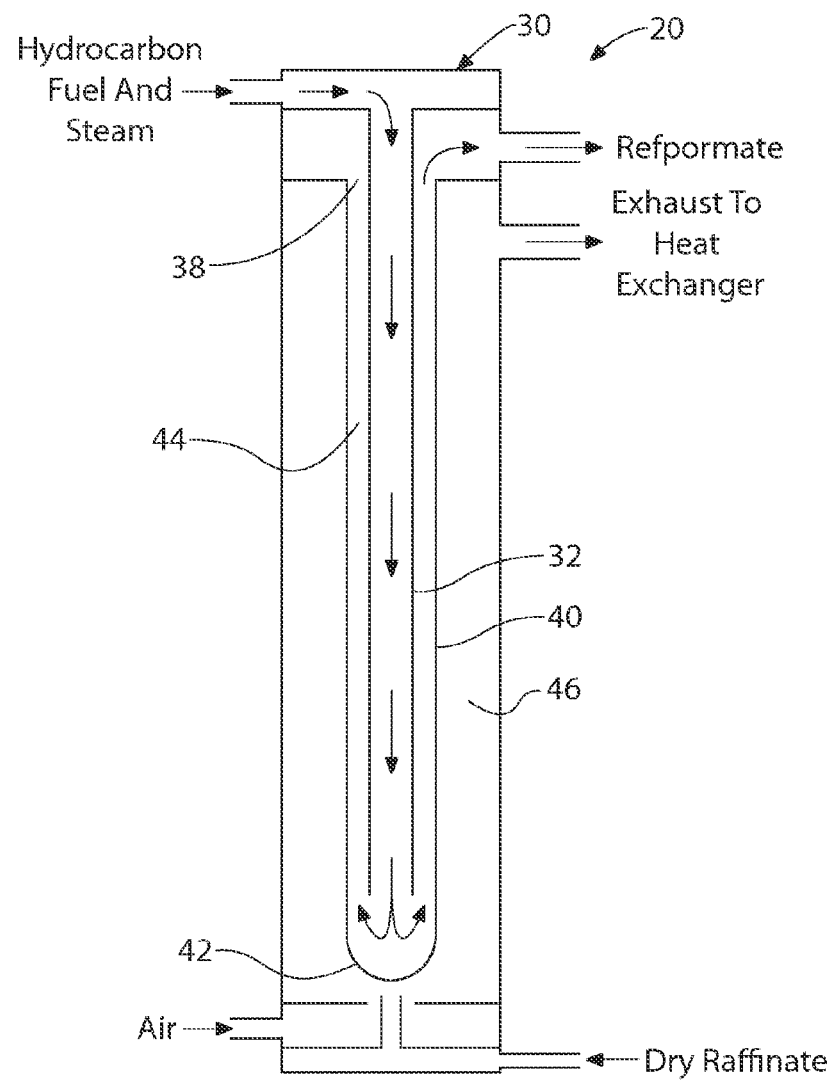
FIG. 2 is a cross-sectional view of a first embodiment of a steam reformer that can be used within the fuel processor system of FIG. 1.

Referring to FIG. 2, a first exemplary embodiment of a reaction cell 30 contained within the micro-channel steam reformer 20 is shown. The micro-channel steam reformer 20 may contain a large plurality of reaction cells 30. However, since all the reaction cells 30 function in the same manner, a single reaction cell 30 is shown for the purpose of simplicity and clarity.

Each reaction cell 30 contains a supply tube 32. The supply tube 32 has an open first end 34 and an open second end 36. The supply tube 32 receives the mixture of hydrocarbon fuel and steam that enters the micro-channel steam reformer 20. The fuel/steam mixture enters the first end 34 of the supply tube 32 and is forced to flow through the supply tube 32.

The supply tube 32 descends into a confinement tube 40. The confinement tube 40 has a closed bottom end 42 and an open top end 38. The open top end 38 leads to the reformate output of the multi-channel steam reformer 20. The confinement tube 40 has an inside diameter that is only slightly larger than the outside diameter of the supply tube 32. Consequently, a very small gap space 44 exists between the interior of the confinement tube 40 and the exterior of the supply tube 32. The gap space 44 is very small, being no larger than 5000 microns. Preferably, the gap space 44 is between 100 microns and 1000 microns. In such a confined space, the water molecules and the fuel molecules are forced to interact, thereby inducing the water gas shift reaction It will therefore be understood that as the fuel/steam mixture enters the reaction cell 30, the fuel/steam mixture is forced to flow down through the supply tube 32. As the fuel/steam mixture exits the second end 36 of the supply tube 32, the fuel/steam mixture is forced to pass through the ultra-small gap space 44 between the confinement tube 40 and the supply tube 32. Heat is added to the fuel/steam mixture while in the gap space 44, therein inducing the water gas shift reaction to occur. By spreading the fuel/steam mixture very thinly throughout the available gap space 44, a highly efficient water gas shift reaction can be created, wherein most of the incoming fuel is converted to less complex molecules.

To ensure a highly efficient water gas shift reaction, heat must be quickly added to the fuel/steam mixture while it flows through the ultra-small gap space 44. To ensure an adequate heat flow, the confinement tube 40 extends into a combustion chamber 46. The dry raffinate gases are burned in the combustion chamber 46, making the combustion chamber 46 very hot. Furthermore, the confinement tube 40 is made with a very thin wall thickness to optimize heat flow through the confinement tube 40 from the combustion chamber 46 and into the gap space 44. Preferably, the confinement tube 40 has a wall thickness of between five and fifty thousandths of an inch.

In the combustion chamber 46, the dry raffinate gases are mixed with air and ignited. The burning dry raffinate gases surround the confinement tube 40, therein providing uniform heat to the confinement tube 40 and to the gap space 44 within the confinement tube 40. The exhaust gases that exit the combustion chamber 46 are very hot and are used to help heat the initial heat exchanger 18 (FIG. 1), as has previously been indicated.

A particular fuel processor system may have hundreds of reaction cells 30 within its multi-channel steam reformer 20. Providing enough dry raffinate to properly heat such a large number of reaction cells can be problematic unless the dry raffinate is utilized in an efficient manner. The simplest way to efficiently utilize the dry raffinate is to limit the size of the combustion chamber 46. However, if the combustion chamber 46 is made too small, incomplete combustion may occur.

Figure 3:
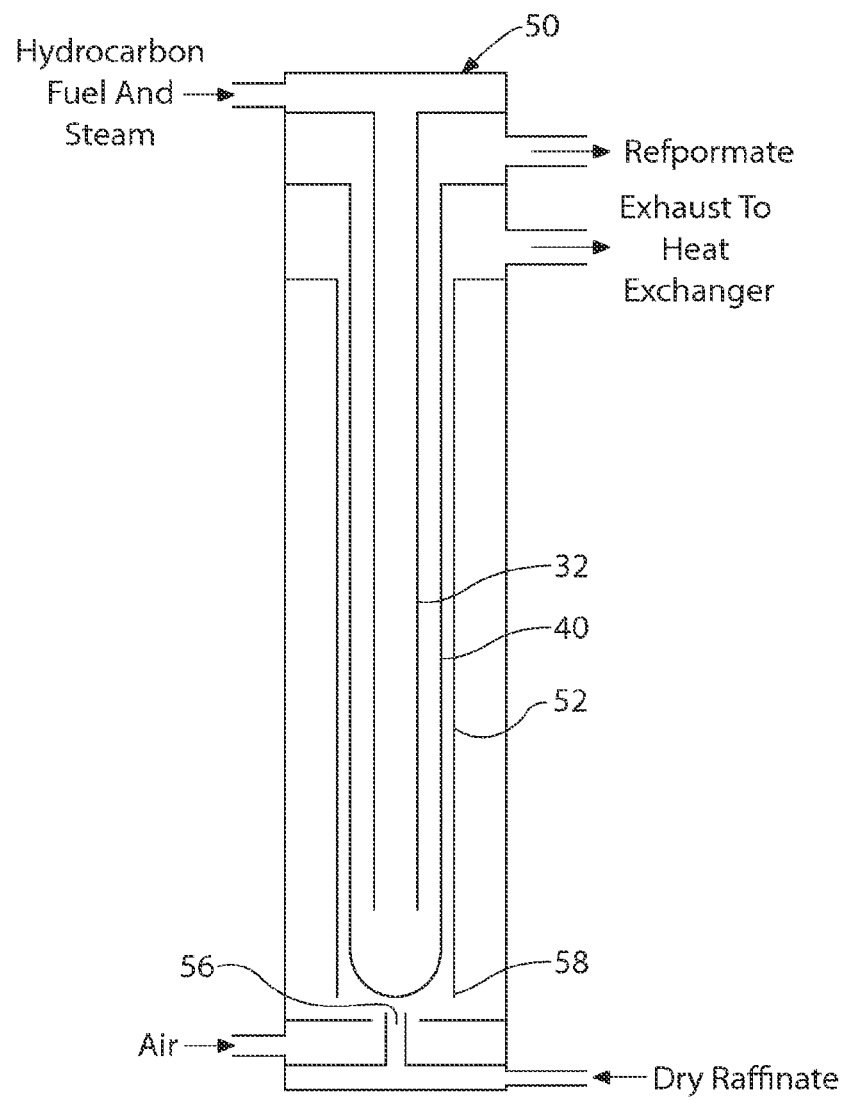
FIG. 3 is a cross-sectional view of a second embodiment of a steam reformer that can be used within the fuel processor system of FIG. 1.

Referring to FIG. 3, a second exemplary embodiment of a reaction cell 50 is shown. In this embodiment, the supply tube 32 and the confinement tube 40 are the same as in the previous embodiment. To increase the efficiency of the use of dry raffinate, a sleeve 52 is placed around the exterior of the confinement tube 40. The sleeve 52 has an inside diameter that is larger than the outside diameter of the confinement tube 40. Consequently, a second gap space 54 exists between the exterior of the confinement tube 40 and the interior of the sleeve 52. The dry raffinate is burned from a pilot hole 56 directly under the bottom open end 58 of the sleeve 52. The sleeve 52, therefore, channels the hot combustion gases into the second gap space 54 and around the confinement tube 40. The entire exterior of the confinement tube 40 can therefore be heated using only a small pilot flame and a small flow of dry raffinate.

It will be understood that the embodiments of the microchannel steam reformer and the overall fuel processor system are merely exemplary and that a person skilled in the art can make many changes using functionally equivalent configurations. For instance, in both embodiments of the reaction cell, the incoming raffinate gas is burned under the confinement tube. It will be understood that depending upon the orientation of the reaction cell, combustion can be initiated at the side or even at the top of the confinement tube.

What is important is that the heat of the combustion evenly heat the exterior of the confinement tube. All such variations, modifications, and alternate embodiments are intended to be included within the present invention as defined by the claims.

What is claimed is:

1. A method of inducing a water gas shift reaction between a hydrocarbon fuel and water, said method comprising the steps of:
   heating said water to superheated steam;
   mixing said hydrocarbon fuel with said superheated steam to produce a fuel/steam mixture;
   flowing said fuel/steam mixture in a gap space between separate surfaces, wherein said gap space between said separate surfaces is no greater than 5000 microns, and said separate surfaces are curved and concentric; and
   heating at least one of said separate surfaces to maintain a reaction temperature range that induces said water gas shift reaction.

2. The method according to claim 1, wherein said gap space between said separate surfaces is no greater than 1000 microns.

3. The method according to claim 1, wherein said separate surfaces are tubular.

4. The method according to claim 1, wherein said separate surfaces include an inner surface and an outer surface.

5. The method according to claim 4, wherein said step of heating at least one of said separate surfaces includes heating said outer surface.

6. The method according to claim 5, wherein said step of heating at least one of said separate surfaces includes exposing said outer surface to combustion gases.

7. The method according to claim 6, further including the step of surrounding said outer surface with a sleeve, wherein said combustion gases flow between said outer surface and said sleeve.

8. The method according to claim 7, wherein said step of heating said water to superheated steam includes transferring heat from said hydrogen gas and said raffinate gases to water to produce superheated steam.

9. The method according to claim 1, wherein said water gas shift reaction creates hydrogen gas and waste raffinate gases, wherein said step of heating at least one of said separate surfaces includes burning at least some of said raffinate gases.

10. A method of producing hydrogen gas from a supply of hydrocarbon fuel, said method comprising the steps of:
    providing a hydrocarbon fuel;
    providing water;
    heating said water to produce steam;
    creating a reaction between said hydrocarbon fuel and said steam in a gap space between opposing surfaces, wherein said reaction produces reactant gases that include hydrogen gas and contaminant gases;
    separating at least some of said hydrogen gas from said contaminant gases, therein leaving enough hydrogen gas mixed with said contaminant gases to create a combustible gas mixture; and
    burning at least some of said combustible gas mixture to heat said gap space.

11. The method according to claim 10, wherein said gap space between said opposing surfaces is no greater than 5000 microns.

12. The method according to claim 11, wherein said gap space between said opposing surfaces is no greater than 1000 microns.

13. The method according to claim 10, wherein said opposing surfaces are tubular and concentric.

14. The method according to claim 10, wherein said step of burning at least some of said contaminant gases produces hot exhaust gases, wherein said hot exhaust gases help heat said water to produce steam.

15. The method according to claim 10, wherein said reactant gases are hot and heat from said reactant gases is recaptured to help heat said water to produce steam.

16. A method of operating a steam reformer for use in inducing a water gas shift reaction between steam and a hydrocarbon, said method comprising the steps of:
    providing at least one reaction cell, wherein each reaction cell contains an inner tube and a concentric outer tube so that a gap space exists between said inner tube and said outer tube;

heating said outer tube to a temperature of over 500 degrees Celsius; and flowing said steam and said hydrocarbon through said gap space.

17. The method according to claim 16, wherein said gap space between said inner tube and said outer tube is less than 5000 microns.

* * * * *